(12) United States Patent
Guard et al.

(10) Patent No.: US 7,380,752 B2
(45) Date of Patent: Jun. 3, 2008

(54) AIRCRAFT INTERIOR ARCHITECTURE

(75) Inventors: Peter S. Guard, Sammamish, WA (US); David A. Young, Bellingham, WA (US)

(73) Assignee: The Boeing Company, Chicago, IL (US)

( * ) Notice: Subject to any disclaimer, the term of this patent is extended or adjusted under 35 U.S.C. 154(b) by 15 days.

(21) Appl. No.: 10/908,140

(22) Filed: Apr. 28, 2005

(65) Prior Publication Data

US 2005/0211841 A1    Sep. 29, 2005

Related U.S. Application Data

(63) Continuation-in-part of application No. 10/688,624, filed on Oct. 17, 2003, now Pat. No. 7,252,267.

(51) Int. Cl.
*B64D 11/00* (2006.01)
(52) U.S. Cl. .................................. 244/118.5
(58) Field of Classification Search ............ 244/118.5, 244/119; 105/329.1, 331; 52/724.4, 88, 52/89, 86
See application file for complete search history.

(56) References Cited

U.S. PATENT DOCUMENTS

| 2,111,326 | A |   | 3/1938  | Forbush              |
|-----------|---|---|---------|----------------------|
| 2,160,066 | A |   | 5/1939  | Frische              |
| 2,287,970 | A |   | 3/1942  | Albertine et al.     |
| 2,415,240 | A |   | 2/1947  | Fouhy                |
| 2,519,109 | A | * | 8/1950  | Callender ........... 236/91 R |
| 2,877,970 | A |   | 3/1959  | Miller et al.        |
| 3,154,888 | A |   | 11/1964 | Graham               |
| 3,330,506 | A |   | 7/1967  | Robillard et al.     |
| 3,404,268 | A | * | 10/1968 | Fowler ............... 362/382 |
| 3,405,893 | A |   | 10/1968 | Rajau et al.         |
| 4,055,317 | A |   | 10/1977 | Greiss               |
| 4,487,034 | A |   | 12/1984 | Cronin et al.        |
| 4,645,145 | A |   | 2/1987  | Alie                 |
| 4,876,828 | A |   | 10/1989 | Brill                |
| 4,911,219 | A |   | 3/1990  | Dalrymple            |
| 5,129,597 | A |   | 7/1992  | Manthey et al.       |
| 5,201,831 | A | * | 4/1993  | Higgins et al. ............ 244/119 |
| 5,245,802 | A |   | 9/1993  | Davis                |
| 5,441,218 | A | * | 8/1995  | Mueller et al. .......... 244/118.1 |
| 5,816,534 | A |   | 10/1998 | Schumacher           |
| 5,820,076 | A | * | 10/1998 | Schumacher et al. .... 244/118.5 |
| 6,007,025 | A |   | 12/1999 | Coughren et al.      |
| 6,082,075 | A |   | 7/2000  | Rysgaard             |

(Continued)

FOREIGN PATENT DOCUMENTS

DE        9406302 U1     5/1995

(Continued)

*Primary Examiner*—Tien Dinh
(74) *Attorney, Agent, or Firm*—Ostrager Chong Flaherty & Broitman P.C.

(57) ABSTRACT

Architectural archway structures for aircraft. The archway structure can be positioned individually, or in pairs or other sets along the length of the interior of an aircraft, such as a commercial passenger airplane. The archways extend across the ceiling of the interior of the cabin and extend downwardly to a point adjacent the luggage bins. End caps are provided to conform the end of the archways with the interior luggage bins. The invention provides a unique "look and feel" and architectural configuration, and does not result in seat loss.

10 Claims, 6 Drawing Sheets

U.S. PATENT DOCUMENTS

| | | | |
|---|---|---|---|
| 6,158,690 A * | 12/2000 | Wadey et al. | 244/17.27 |
| 6,212,835 B1 * | 4/2001 | Schiedegger et al. | 52/211 |
| 6,491,254 B1 | 12/2002 | Walkinshaw et al. | |
| 2004/0026436 A1 | 2/2004 | Ely | |
| 2005/0082430 A1 | 4/2005 | Young | |
| 2005/0135093 A1 * | 6/2005 | Alexanderson et al. | 362/227 |

FOREIGN PATENT DOCUMENTS

| | | |
|---|---|---|
| EP | 0325756 | 8/1989 |
| EP | 0774815 | 5/1997 |
| EP | 0867365 | 9/1998 |
| EP | 1106502 | 6/2001 |
| FR | 876942 | 11/1942 |
| FR | 933414 | 4/1948 |
| FR | 2303711 | 8/1976 |
| WO | WO 02/066324 | 8/2002 |
| WO | WO 92/18730 | 10/2002 |
| WO | WO2004101342 A1 | 11/2004 |

* cited by examiner

AIRCRAFT INTERIOR ARCHITECTURE

CROSS-REFERENCE TO RELATED APPLICATIONS

This application is a continuation-in-part of U.S. application Ser. No. 10/688,624, filed on Oct. 17, 2003 now U.S. Pat. No. 7,252,267.

TECHNICAL FIELD

The present invention relates to architectural structures for the interior of an aircraft, particularly the interiors of commercial passenger airplanes.

BACKGROUND OF THE INVENTION

The interior configuration and architecture of aircraft have become relatively standardized today. The arrangements of the passenger seats, bulkheads, lavatories, serving areas, and the like have been developed for convenience and accommodation of both passengers and crew. The passenger compartments are typically divided into two or more sections with bulkheads and lavatories being positioned accordingly. Aisles and passageway spaces are left between sets of seats and at the access doors.

The related application Ser. No. 10/688,624, describes unique designs for architectural structures, especially archway elements which are incorporated into the interior design of an aircraft, particularly commercial passenger airplanes. The archways can be positioned individually, or in pairs or other sets along the length of the passenger cabins of the aircraft. The archways are used to run or connect various transport elements, such as electrical wiring, water lines, and environmental control system conduits, between the upper crown, lower bay, and passenger cabin of the aircraft. That invention simplifies installation complexity and eliminates the installation and variability associated with running transport elements between the various sections of the aircraft. It also provides a unique "look and feel" to passengers entering the passenger cabins of the aircraft.

It is an object of the present invention to provide a related "look and feel" of airplane passenger cabin configurations, but without the possibility of a loss of seating capacity and possible reduced revenue that would go along with it. As a result, the present invention attempts to provide a similar "look and feel" with another unique structural configuration, particularly at the entrance/exit doorway of an aircraft, without incurring any seat loss.

SUMMARY OF THE INVENTION

In accordance with the present invention, one or more arch-type members ("archways" or "archway structures") are positioned in the passenger cabin of the aircraft. The archways preferably are inverted generally "U-shaped" structures with ends extending from locations partially up the sidewalls of the interior of the aircraft, and with middle portions extending along the inside surfaces of the ceiling of the interior compartment. The archways can be combined with or blended into lighted ceiling panels in order to provide an integral combined pleasing appearance in the interior of the aircraft.

The archways are provided particularly at the entranceways into the passenger cabins and convey a sense of welcome, that is, an improved "look and feel" for the passengers, especially upon entry into the passenger compartment. The invention establishes an architectural space for in-flight use by the passengers and a use of geometry in the interior to modulate space in a pleasing and aesthetic manner in the passenger cabin. It is believed that a majority of present passenger airplane configurations can utilize the present invention for the entrance and exit areas of the aircraft without incurring any seat loss.

With the present invention after the archway elements are installed, adjoining monuments can be located outside of the entranceway in a cabin area in front of the forward arch or behind the aft arch. Since the two ends of the "U-shaped" archway structure terminate part way down the sides of the interior of the aircraft, unique end caps (or "cap members") are used to merge or conform the structural configuration into the overhead luggage bins or the like. The present invention also can be used in combination with the longer U-shaped archways as disclosed in related patent application Ser. No. 10/688,624 in order to help define established cabin proportions and at the same time provide logical location for passage of auxiliary system components.

The present inventive archways further allow standardized modular aircraft interior configurations and reduce the complexity associated with present interior structures.

DESCRIPTION OF THE PREFERRED EMBODIMENTS

Efficient interior configuration and modification of airplanes and other aircraft is of value to airline companies and customers by reducing the costs associated with designing and installing cabin furnishings and auxiliary and support systems. Often, these activities will result in modifications to system transport elements, such as electrical wiring, water lines, or environment control system ducts resulting in increased costs and lead time for delivery of the desired aircraft. This problem is amplified for those transport elements that must run or be passed between the airplane crown and the lower lobe or bay, since current design practices result in loss of windows in the sidewalls, or longer than desired runs to fixed monuments at the fore or aft bulkheads.

The complexity and costs associated with providing for system runs between the crown and lower bays of airplanes and other aircraft has a significant impact on interior architecture, interior flexibility, body structure at doorways and manufacturing installation time. The present invention simplifies the installation complexity and eliminates the installation variability associated with running transport elements between the crown and lower bay areas.

In particular, the present invention uses architectural arches or archways at one or more locations along the length of the aircraft. The archways provide raceways or passageways for system transport elements, particularly for those which need to be passed from the crown to the lower bay of the aircraft. The archways also can be placed at stable locations within the fuselage or cabin of the aircraft, such as at fixed door locations which reduce the potential impact on seat configuration and provide improved cabin configurations.

Archways located on either side of a doorway will enable a number of different functions, such as architectural delineation of cabin volumes that are properly proportioned, and enclosure of system transport elements, including, but not limited to, electrical power and signal, water and conditioned air. The architectural archways also can incorporate a stable floor coupling in order to pass system transporting elements through the floor while meeting existing requirements for floor penetrations.

The inventive archways further will provide accommodation for items, including, but not limited to, system control panels, lavatories, emergency equipment and flight attendant seats. When properly sized and configured, the archways will have the ability to provide for retractable features or otherwise hide these elements within the archway when not in use.

With the present invention, an altered method for interior cabin lighting via recessed task lighting can result, particularly through the use of luminescent cover panels or wash lighting from within the archways. The present invention will also provide a way to more efficiently create and control air temperature zones within the cabin by using an archway located air curtain to prevent air draft from moving fore and aft between cabins.

The present invention further can reduce the impact of external temperature extremes on cabin interior temperatures while in the boarding or deplaning processes.

With the present invention, various stations or zones within the cabin can be designated where passengers can experience a local enhanced air environment contained within a station or zone. This could include local humidification, increased air mixing, or ionized/purified air.

Finally, the present invention can provide a more integrated look for outboard lavatories or gallery monuments by designing the archways to accept the modules without the use of closeout seals or foams. In this regard, system connections servicing these monuments can be readily accessible.

The use of archways located at doorways can serve as a system plenum to connect the systems that run between the crown of the airplane, the lower lobe or bay, and the main passenger cabin. The archways can assist in defining and establishing cabin proportions and also provide logical locations for system runs associated with water, power, and conditioned air. The placement at door locations provides a way to run systems at each doorway without having to interfere with the structural intercoastals located between frame bays typically positioned at door locations.

With the present invention, the penetration through the floor can be standardized which will reduce the variation in floor panel designs.

If the archways are used for lavatory and galley monuments, this can reduce the complexity associated with integrating these elements into the interior, as well as eliminating the need for designed closeout seals for outboard monuments.

Figure 1:
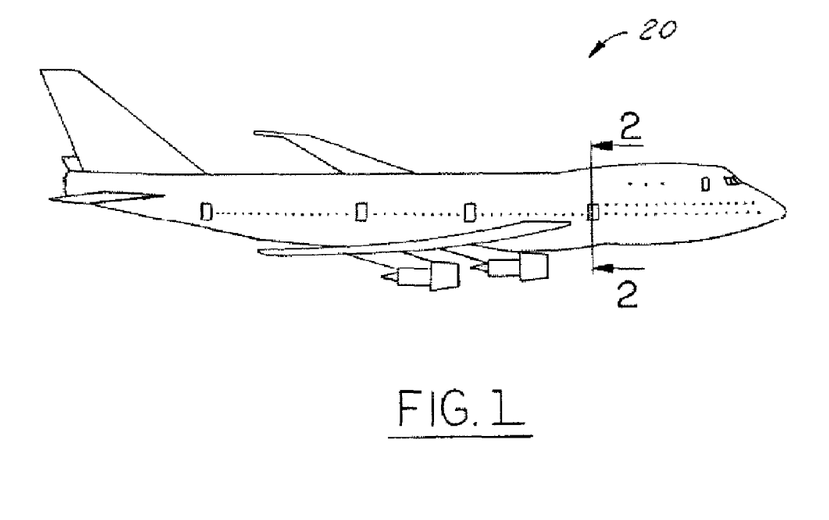
FIG. 1 illustrates an aircraft in which the present invention can be utilized.

FIG. 1 is a perspective view of an airplane or aircraft in which the present invention can be utilized. The airplane is referred to generally by the reference numeral 20.

Figure 2:
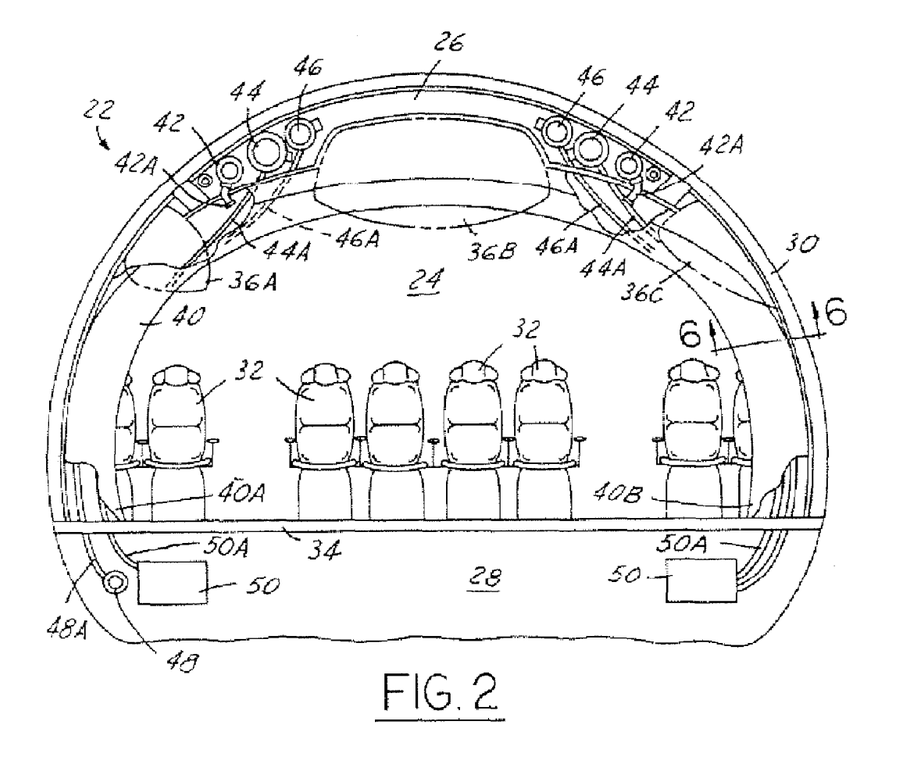
FIG. 2 is a cross-section through the aircraft as shown in FIG. 1 and depicting use of the present invention.

FIG. 2 is a representative cross-section 2-2 taken at a location along the length of the fuselage or passenger cabins of the airplane 20. As indicated, the aircraft includes a main passenger cabin 24, an upper crown area 26 and a lower lobe or bay 28, all positioned within an outer skin or exterior 30 of the airplane. The lower bay 28 typically is utilized for transporting luggage and other material. The passenger cabin or compartment 24 includes a number of passenger seats 32 which are positioned on a floor member 34 that extends across the width of the airplane 20. Also, as conventional in airplanes today, a number of luggage or storage bins 36A, 36B, and 36C are provided on the upper portion of the passenger cabin 24.

Figure 6:
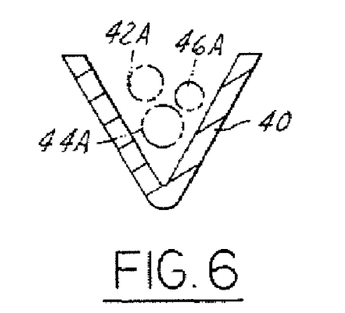
FIG. 6 is a cross-sectional view of the archways as shown in FIG. 2.
Figure 8:
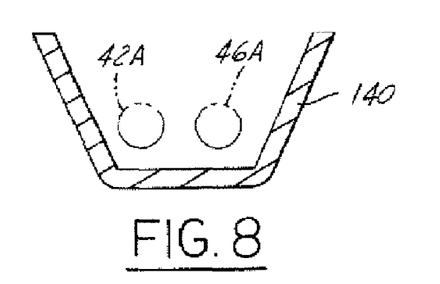
FIG. 8 is a cross-section of still another alternate embodiment of an archway in accordance with the present invention.
Figure 10:
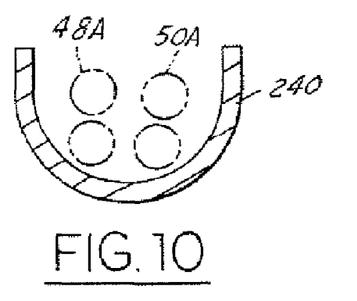
FIG. 10 depicts a cross-section of still another alternate embodiment of an archway in accordance with the present invention.

An architectural arch or archway 40 is shown in its representative position within the airplane 20. The archway has a semi-circular or curved configuration as shown and is attached to the floor member 34 at its two lower ends 40A and 40B. The archway can be attached to the floor member in any conventional manner. The archway 40 preferably has a V-shaped cross-section as shown in FIG. 6. Although a V-shaped cross-section is preferred, it is also possible within the scope of the present invention for the archway 40 to have other cross-sectional sizes and shapes. For example, the archway 140, as shown in FIG. 8, has an expanded U-shaped cross-sectional configuration and shape, while the archway 240 as shown in FIG. 10 has a semi-circular or curved cross-sectional shape and configuration.

As shown in FIG. 2, an aircraft, such as airplane 20, has a number of control, auxiliary and support systems which have wires and conduits which need to be passed or run along the aircraft and to be utilized at various positions along the length of the aircraft. These lines and conduits also need to be passed at some locations between the crown and lower bay areas of the aircraft. The conduits for these systems are shown in FIG. 2 and are represented generally by reference numerals 42, 44, 46, 48, and 50. The conduits and systems mentioned and shown are only representative of the known and conventional systems used in aircraft today, such as electrical wiring, control wiring, water lines, air ducts, environment control system ducts, etc.

With the configuration shown, the system wires and conduits 42, 44, and 46 are positioned in the upper portion or crown 26 of the fuselage of the aircraft. In addition, other systems and conduits, such as 48 and 50 shown in FIG. 2, are positioned in the lower lobe or bay of the aircraft. In order to utilize these systems, the archways 40 of the present invention allow or act as passageways or chase ways for electrical lines and other conduits, such as 42A, 44A, and 46A, 48A and 50A. As shown in the cross-sectional view in FIG. 6, the conduits are positioned in the interior open space of the archway 40. Some of these same conduits and wires are also shown in FIGS. 8 and 10.

Figure 7:
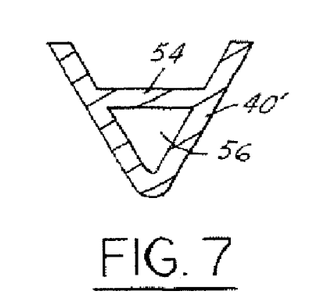
FIG. 7 is a cross-section of an alternate embodiment of an archway in accordance with the present invention.

In accordance with the present invention, it is also possible to have one or more of the conduits or ducts be molded or provided as part of the archway itself. This is shown in FIG. 7, where archway 40' has a cross member 54 which forms an enclosed plenum or chamber 56. It is also to be understood, of course, that any number of interior conduits and plenums can be provided in the archways in accordance with the present invention and thus the invention is not limited to a structure having at least one plenum or any number thereof.

It is to be understood that the various cross-sectional sizes and shapes of the archways 40, 140, and 240 are only illustrative of the various cross-sectional sizes and shapes of archways that can be utilized in accordance with the present invention. Thus, the present invention is not limited to any particular size or shape of cross-section.

It is also possible to provide more than one integral or "built-in" conduit or passageway in the archway. Also, the integral conduits or passageways do not have to extend the full length of the archway, but can be positioned only in one or more portions thereof, such as in the portions which are positioned along the inner sides of the aircraft fuselage. It is further possible to provide one or more archways for the aircraft which are not hollow at all, or are only hollow along portions thereof.

Figure 3:
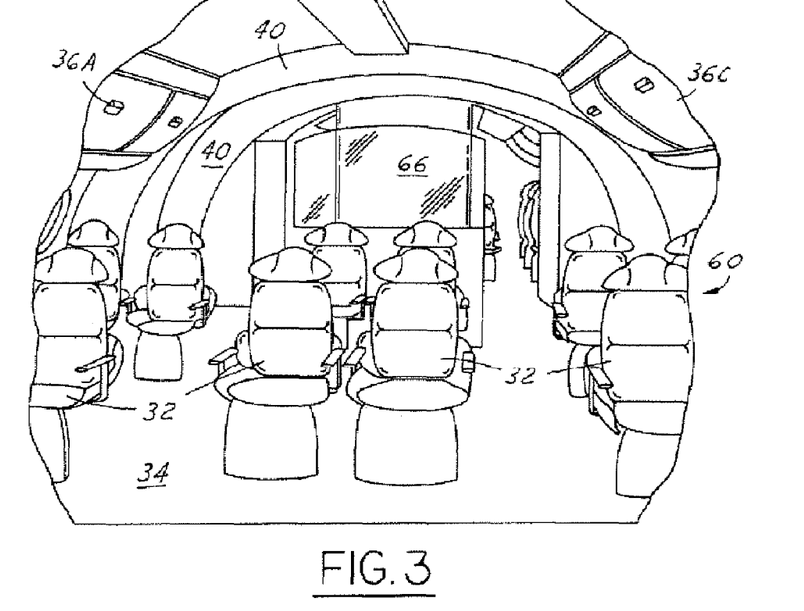
FIG. 3 is a perspective view of an aircraft cabin interior, illustrating the use of the present invention.
Figure 4:
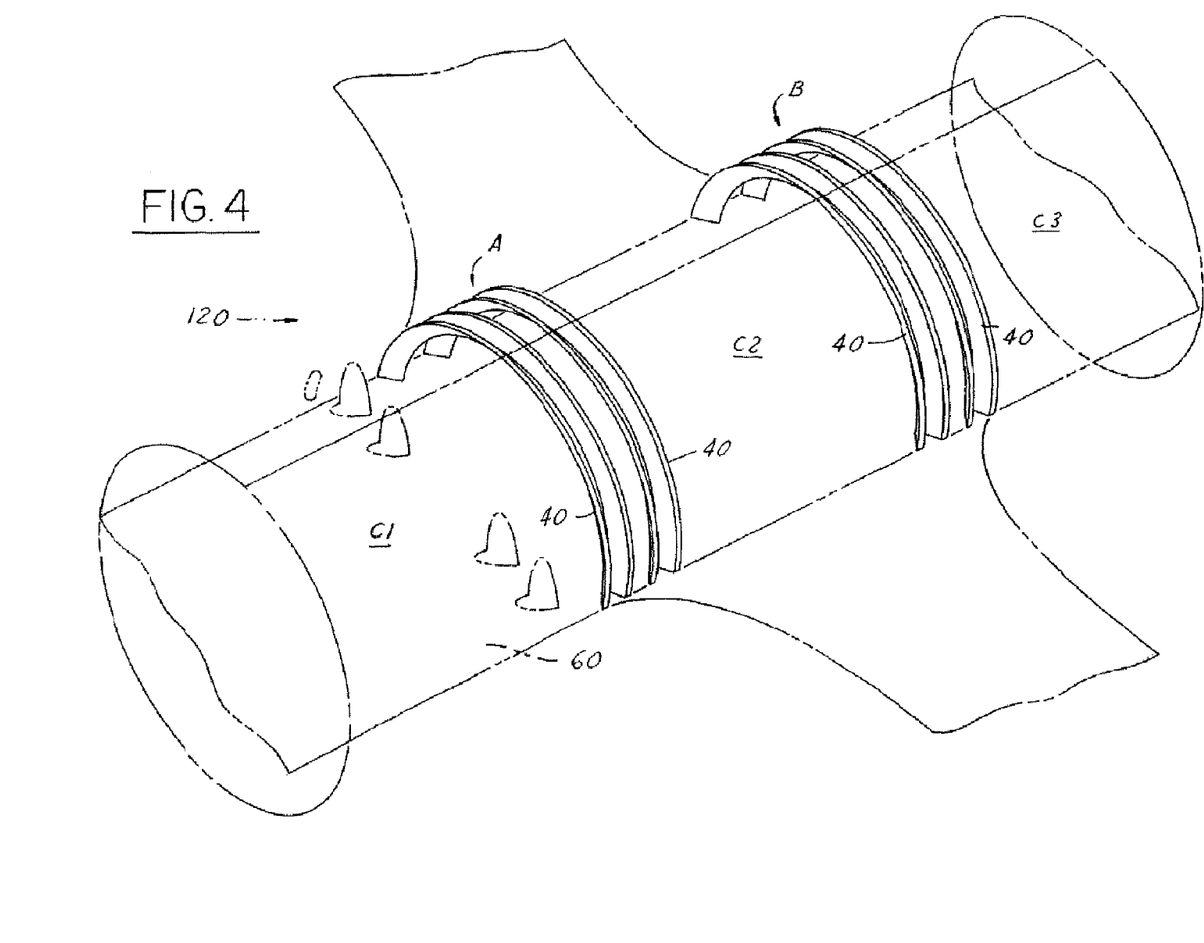
FIG. 4 is a perspective view illustrating the use of a plurality of archways in an aircraft in accordance with the present invention.
Figure 5:
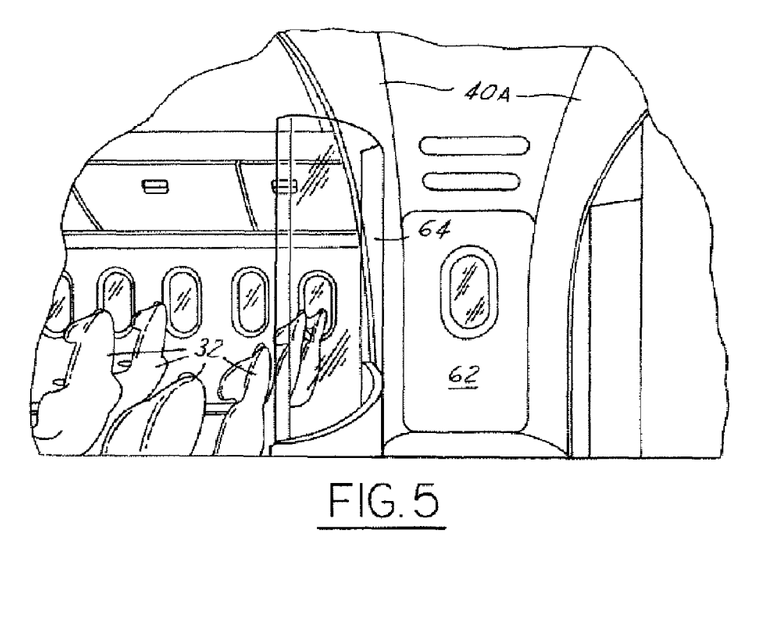
FIG. 5 depicts the use of a pair of inventive archways at an exterior door to the passenger compartment.

In accordance with one embodiment of the present invention, pairs of arches or archways 40 can be positioned at various locations along the length of the aircraft or airplane. This is shown in FIGS. 3-5. First, as shown in FIG. 4, two sets A, B of pairs of archways 40 are shown located at two positions in the fuselage of airplane 120. An interior view of the fuselage 60 in the direction of the length of the fuselage is shown in FIG. 3. The archways 40 are used to separate the fuselage into various passenger cabins C1, C2, and C3 along the length of the airplane.

A side elevational view illustrating one of the pairs of archways 40A is shown in FIG. 5. The pair of archways 40A is also used to frame a door member 62. In this regard, as shown in FIGS. 3 and 5, various petitions 64 and 66 can be positioned in or adjacent to the archways 40, 40A in order to assist in separating the interior cabins, such as C1, C2 and C3, from one another.

It is to be understood in accordance with the present invention, that any number of archways can be provided along the length of the fuselage of an airplane or aircraft. It is also understood that any number of pairs or sets of archways can be provided at various locations along the length of the aircraft.

Figure 9:
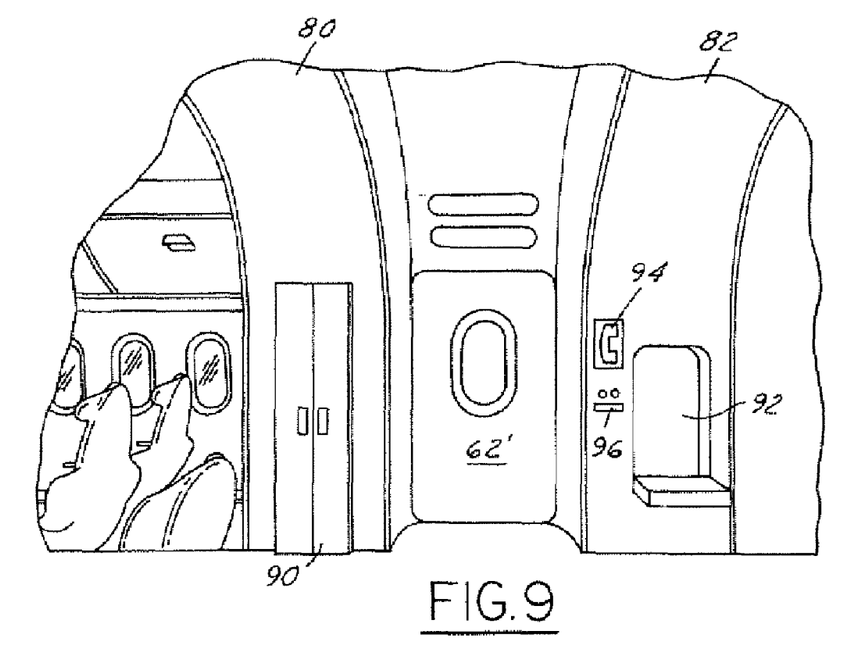
FIG. 9 illustrates use of the present invention for lavatories and other accessory systems.

As shown in FIG. 9, archways in accordance with the present invention can also be used to house or accommodate various accessories or auxiliary systems which are common in passenger airplanes today. In this regard, archways 80 and 82 are used to frame or flank a door member 62' at a location along the length of the airplane. Archway 80 is sufficiently wide to incorporate a lavatory 90, while archway 82 has a width sufficient to incorporate a jump seat 92 for one of the flight attendants. Also, as shown in FIG. 9, an archway can be modified to incorporate various other items and systems, such as telephone 94 and electronic controls 96 for other systems on the airplane.

Figure 11:
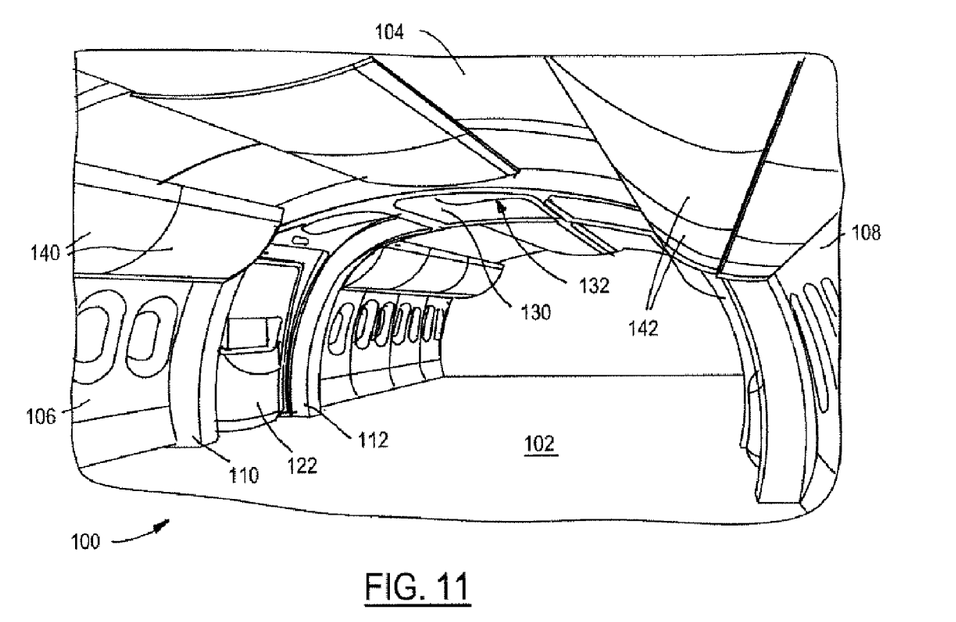
FIG. 11 is a perspective view of an aircraft interior utilizing modular arches or archways that extend along the length of the passenger cabins.

FIG. 11 is a perspective view of an interior of an aircraft, such as a commercial passenger airplane, referred to generally by the reference numeral 100. The interior includes a floor member or panel 102, a ceiling member 104 and a pair of side structures or panels 106 and 108. A pair of modular arch members 110 and 112 are shown generally framing an entrance/exit door 122. The archways 110 and 120 merge neatly into ceiling panels, such as panel 130, which has a recessed lighting fixture 132.

Luggage bins 140 and 142 are positioned (typically in rows) along the upper portions of the sidewalls 106 and 108 as shown. The luggage bins have a curved outer surface and have doors which open and close (not shown) so that passengers can place luggage and packages inside the bins. Also, as understood, a plurality of passenger seats are typically positioned on the floor panel 102, as shown, for example, in FIGS. 2 and 3 above. The seats are not shown in FIGS. 11 and 12 so that other portions of the interior can be more clearly viewed and described.

Figure 12:
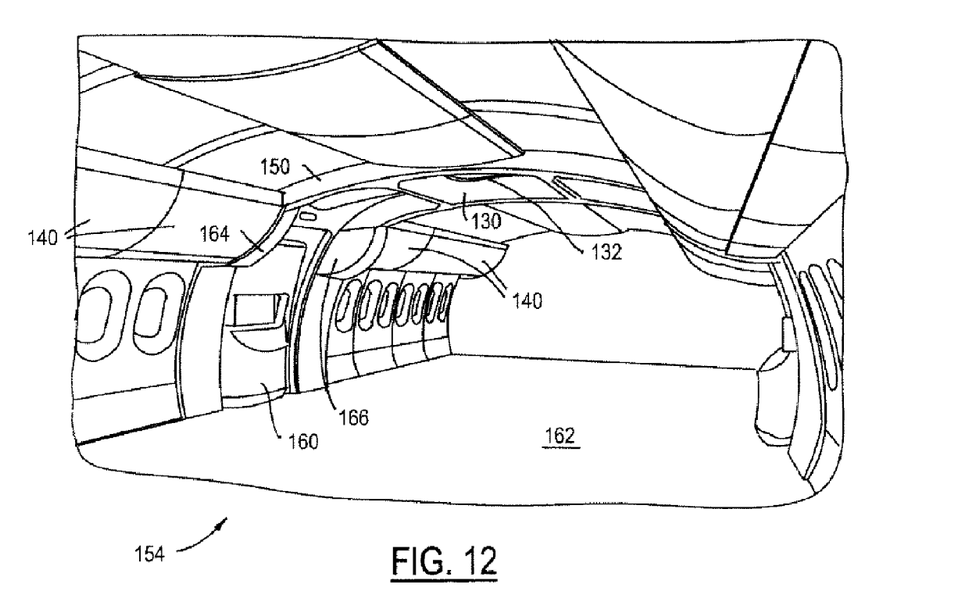
FIGS. 12-13 are perspective views illustrating use of the present invention in association with an insert/exit door of the aircraft, including the use of end caps.
Figure 13:
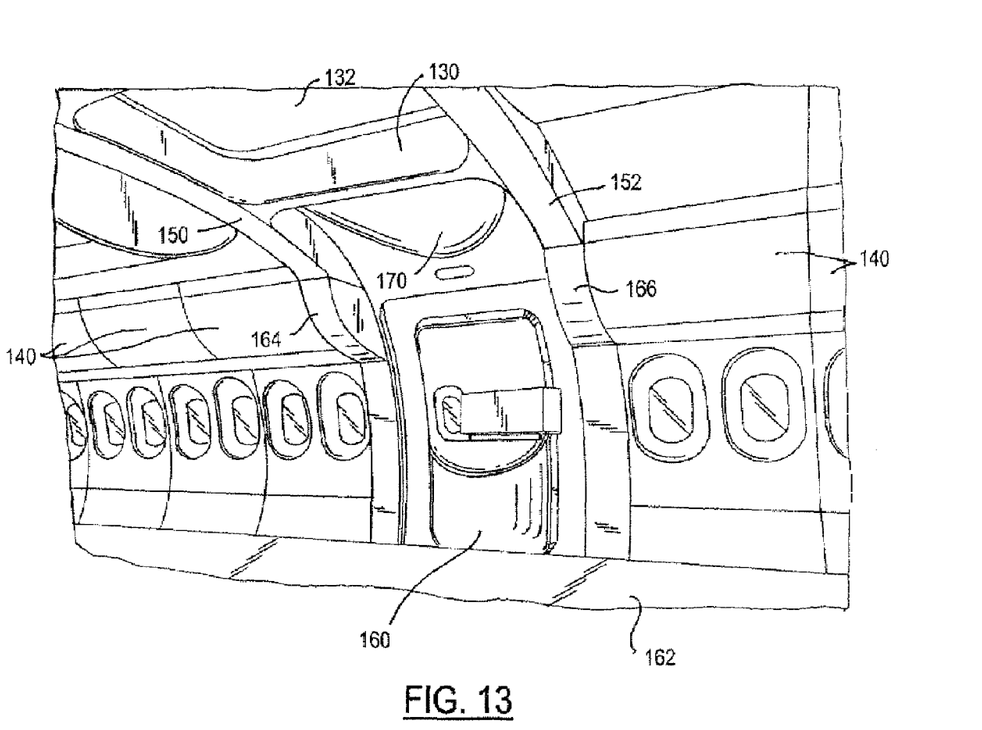

FIGS. 12 and 13 illustrate a pair of shorter U-shaped arch-type members 150 and 152 which are positioned inside an interior of an airplane which is represented generally by the reference numeral 154. The arch-type members are inverted substantially arcuate structures which can be attached to the ceiling panels, the fuselage, or the like and preferably have a shape and configuration which conforms to the shape and configuration of the elongated ceiling in the interior of the passenger cabin. As shown, the archway members 150 and 152 frame or bracket an entrance/exit door 160 but do not extend all the way to the floor panel 162. Instead, the archway members 150 and 152 terminate with end caps 164 and 166. The end caps have a curvature and configuration that blend with and conform to the curvature of the luggage bins 140 which typically extend down the length of the interior of the aircraft.

With the configuration shown in FIG. 12, a pleasing and aesthetic look and feel for the aircraft interior is provided without any resultant loss of room for seats and passengers. The ceiling panels, such as panels 132 and 170 comprise sheets of translucent plastic material backlit with lighting members, such as fluorescent lights. This assists in providing a pleasing look and feel to the passengers as they enter the interior of the aircraft.

Figure 14:
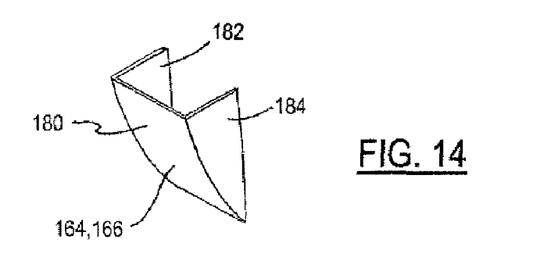
FIG. 14 illustrates a representative end cap member.

FIG. 14 illustrates a representative cap members 164, 166. The cap members are preferably made of a plastic material, but could also be made of a light metal material, such as aluminum. The cap members 164, 166 can have a generally U-shaped cross-section with a front panel member 180 and a pair of side panel members 182 and 184. If the storage bins have finished exterior side surfaces adjacent the cap members, then it may not be necessary to provide both side panel members. The front panel member 180 has a curvature or configuration which conforms to the exterior surface configuration of the luggage bins 140.

The pair of end cap member 164, 166 can be made and supplied separately and then assembled with the inverted arcuate-shape on site or in the airplane. Alternatively, the architectural archway members can be made and supplied as one unitary piece with a center arcuate portion and two end members configured to match the configuration of the luggage bins.

While the invention has been described in connection with one or more embodiments, it is to be understood that the specific mechanisms, processes and procedures which have been described are merely illustrative of the principles of the invention, numerous modifications may be made to the methods and apparatus described without departing from the spirit and scope of the invention as defined by the appended claims.

What is claimed is:

1. An architectural archway structure for an aircraft having an elongated fuselage, at least one passenger cabin in the fuselage, first and second sidewall members extending along the fuselage, a ceiling member extending along the fuselage, at least one luggage bin positioned in the fuselage adjacent one of said sidewall members and said ceiling member, said at least one luggage bin having a longitudinal axis, the archway structure comprising at least one central member adapted to be positioned on the ceiling member and having two spaced apart ends, said two spaced apart ends extending downwardly to a point adjacent the at least one luggage bin, and end cap members being aligned with said longitudinal axis and having an external shape substantially the same as the external shape of the at least one luggage bin and being positioned adjacent to said two spaced apart ends to conform said two spaced apart ends to the shape and dimension of an adjoining section of the at least one luggage bin and wherein said structure is hollow and is adapted as a passageway for support system components.

2. The architectural archway structure for an aircraft as described in claim 1 wherein at least one of the end cap members has a front panel member and at least one side panel member.

3. The architectural archway structure for an aircraft as described in claim 1 wherein said end cap members have a cross-sectional shape selected from the group comprising V-shaped, U-shaped and semi-circular shaped.

4. The architectural archway structure for an aircraft as described in claim 1 wherein at least two structures are provided.

5. A pair of architectural archways members for an aircraft having an elongated fuselage, at least one passenger cabin in the fuselage, a pair of sidewall members, a ceiling member, a plurality of luggage bins having a longitudinal axis and positioned adjacent the sidewall members and the ceiling member, and at least one doorway for ingress into the passenger cabin, the pair of archway members adapted to be positioned on opposite sides of the doorway and conform to the shape and dimension of an adjoining section of the luggage bins, each of the archway members comprising an inverted curved portion and a pair of end portions, said end portions extending downwardly to a point adjacent the luggage bins, and end cap members having an external shape substantially the same as the luggage bins and being positioned adjacent to the end portions and the luggage bins to conform said end portions to the shape and dimension of the luggage bins, wherein said end cap members are aligned with said longitudinal axis and wherein each of said pair of architectural archways members is hollow and is adapted as a passageway to support system components.

6. A pair of architectural archways members as described in claim 5 wherein the curved configuration of the inverted curved portion is configured to conform to the shape and dimension of an adjoining section of the ceiling member.

7. A pair of architectural archways members as described in claim 5 wherein each of said archways members has a cross-sectional shape selected from the group comprising V-shaped, U-shaped, and semi-circular shaped.

8. An aircraft having a fuselage with a passenger cabin for transporting passengers from one destination to another, the passenger cabin having a floor member, a ceiling member, a pair of sidewall members extending between the floor member and the ceiling member, a door member in one of said sidewall members, and a plurality of luggage bins positioned along the sidewall members adjacent the ceiling member and having a longitudinal axis, and at least one archway structure member, said archway structure member having a central portion positioned adjacent the ceiling member and at least one end portion positioned adjacent said luggage bins, wherein said at least one archway structure member is hollow and is adapted as a passageway for support system components, and each said end portion having an end cap member that has an exterior shape and dimension substantially the same as the shape and dimension of an adjoining section of said luggage bins, the end portion being aligned with said longitudinal axis.

9. The aircraft as described in claim 8 wherein said central portion has an inverted curved configuration.

10. The aircraft as described in claim 8 wherein two archway members are provided, one each positioned on opposite sides of said door member.

* * * * *